US010479651B2

(12) United States Patent
Strbuncelj (10) Patent No.: US 10,479,651 B2
(45) Date of Patent: Nov. 19, 2019

(54) COOLING OF MACHINE FOR ELEVATOR SYSTEM

(71) Applicant: Otis Elevator Company, Farmington, CT (US)

(72) Inventor: Zlatko Strbuncelj, Avon, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/029,706

(22) PCT Filed: Oct. 17, 2013

(86) PCT No.: PCT/US2013/063033
§ 371 (c)(1),
(2) Date: Apr. 15, 2016

(87) PCT Pub. No.: WO2015/057181
PCT Pub. Date: Apr. 23, 2015

(65) Prior Publication Data
US 2016/0251203 A1    Sep. 1, 2016

(51) Int. Cl.
| B66B 11/04 | (2006.01) |
| H02K 5/18 | (2006.01) |
| H02K 1/20 | (2006.01) |
| H02K 7/10 | (2006.01) |

(Continued)

(52) U.S. Cl.
CPC .............. *B66B 11/043* (2013.01); *H02K 1/20* (2013.01); *H02K 5/18* (2013.01); *H02K 7/102* (2013.01); *H02K 7/1016* (2013.01); *H02K 9/04* (2013.01)

(58) Field of Classification Search
CPC ..... B66B 11/043; B66B 11/0438; H02K 5/18; H02K 9/02; H02K 9/04; H02K 9/06
See application file for complete search history.

(56) References Cited

U.S. PATENT DOCUMENTS 3,188,833 A * 6/1965 Robinson ................. H02K 9/20
                                                    310/54
3,932,778 A * 1/1976 Watanabe ................. H02K 9/04
                                                    310/61

(Continued)

FOREIGN PATENT DOCUMENTS

| CN | 102365225 A | 2/2012 |
| CN | 102471028 A | 5/2012 |
| WO | 0136835 A1 | 5/2001 |

OTHER PUBLICATIONS

Notification of Transmittal of the International Search Report and the Written Opinion of the International Searching Authority, or the Declaration; Application No. PCT/US2013/063033; dated Jun. 25, 2014; 12 pages.

(Continued)

*Primary Examiner* — Minh Truong
(74) *Attorney, Agent, or Firm* — Cantor Colburn LLP (57) ABSTRACT

An electric machine includes a rotor including a plurality of permanent magnets. The rotor is rotatable about a central axis of the machine. The machine further includes a stator having a stator hub and a plurality of stator windings positioned at the stator hub and located radially inboard of the plurality of permanent magnets. A plurality of fins extend radially inwardly from an inner surface of the stator hub.

10 Claims, 6 Drawing Sheets

(51) Int. Cl.
*H02K 7/102* (2006.01)
*H02K 9/04* (2006.01)

(56) References Cited

U.S. PATENT DOCUMENTS

| | | | | |
|---|---|---|---|---|
| 4,839,547 A * | 6/1989 | Lordo | ............ | H02K 9/06 |
| | | | | 310/60 A |
| 4,960,186 A * | 10/1990 | Honda | ............ | B66B 11/0438 |
| | | | | 187/254 |
| 6,239,520 B1 | 5/2001 | Stahl et al. | | |
| 6,727,609 B2 * | 4/2004 | Johnsen | ............ | H02K 1/32 |
| | | | | 310/52 |
| 6,982,506 B1 * | 1/2006 | Johnsen | ............ | H02K 9/00 |
| | | | | 310/270 |
| 7,834,492 B2 * | 11/2010 | Iund | ............ | H02K 5/20 |
| | | | | 310/52 |
| 8,207,642 B2 * | 6/2012 | Lafontaine | ............ | H02K 1/187 |
| | | | | 310/90 |
| 8,242,644 B2 * | 8/2012 | Booth | ............ | H02K 9/08 |
| | | | | 310/52 |
| 8,258,670 B2 * | 9/2012 | Sakuma | ............ | H02K 1/185 |
| | | | | 310/216.118 |
| 9,067,763 B2 * | 6/2015 | Strbuncelj | ............ | B66B 11/043 |
| 9,197,116 B2 * | 11/2015 | Junge | ............ | H02K 1/276 |
| 2003/0067228 A1 | 4/2003 | Vanjani | | |
| 2003/0121727 A1 | 6/2003 | Adifon et al. | | |
| 2005/0047912 A1 * | 3/2005 | Giesler | ............ | F01D 11/003 |
| | | | | 415/231 |
| 2011/0304227 A1 | 12/2011 | Bradfield | | |
| 2012/0112577 A1 * | 5/2012 | Strbuncelj | ............ | B66B 11/0438 |
| | | | | 310/63 |
| 2012/0248908 A1 * | 10/2012 | Zahora | ............ | F04D 25/082 |
| | | | | 310/62 |
| 2013/0026868 A1 | 1/2013 | Klafter et al. | | |
| 2013/0119829 A1 * | 5/2013 | Andersen | ............ | H02K 1/32 |
| | | | | 310/60 A |

OTHER PUBLICATIONS

Chinese Office Action Issued in CN Application No. 201380080260.8, dated Jan. 2, 2018, 7 Pages.
Chinese Office Action Issued in CN Application No. 201380080260.8, dated Sep. 7, 2018, 9 Pages.

* cited by examiner

COOLING OF MACHINE FOR ELEVATOR SYSTEM

BACKGROUND

The subject matter disclosed herein relates to electric machines. More specifically, the subject disclosure relates to cooling of electric machines.

Electric motors are used in a variety of systems. For example, elevator systems utilize ropes or coated steel belts operably connected to an elevator car, and driven by a motor, also referred to as a machine, to propel the elevator car along a hoistway. The machine drives a sheave, in this case a traction sheave, over which the rope or coated steel belt is routed. The rope or belt gains traction at the traction sheave, such that rotation of the traction sheave consequently drives movement of the elevator car.

The machine is typically a permanent magnet electric machine including a stator having one or more conductive stator windings and a rotor including one or more permanent magnets. During operation, the stator windings generate high levels of thermal energy which must be dissipated so that the machine can remain operational. To cool the stator windings, a blower is typically utilized to blow cooling air across the stator windings or around an outer diameter of the stator Improvements in heat dissipation from the stator contribute to increased operational efficiency and reliability of the machine and thus the elevator system.

BRIEF DESCRIPTION

In one embodiment, an electric machine includes a rotor including a plurality of permanent magnets. The rotor is rotatable about a central axis of the machine. The machine further includes a stator having a stator hub and a plurality of stator windings positioned at the stator hub and located radially inboard of the plurality of permanent magnets. A plurality of fins extend radially inwardly from an inner surface of the stator hub.

In another embodiment, an elevator system includes an elevator car and a drive member operably connected to the elevator car. A traction sheave is in frictional contact with the drive member, and a machine is operably connected to the traction sheave. The machine includes a rotor having a plurality of permanent magnets. The rotor is rotatable about a central axis of the machine. The machine further includes a stator including a stator hub and a plurality of stator windings positioned at the stator hub and located radially inboard of the plurality of permanent magnets. A plurality of fins extend radially inwardly from an inner surface of the stator hub.

In yet another embodiment, a method of cooling stator windings of an electric machine includes urging a cooling airflow into the machine toward a stator assembly of the machine. The stator assembly includes a stator hub and a plurality of stator windings positioned at the stator hub and located radially inboard of a rotor of the electric machine. A plurality of fins extend radially inwardly from an inner surface of the stator hub. The cooling airflow is flowed across the plurality of fins, thus transferring thermal energy between the cooling airflow and the plurality of stator windings. The plurality of stator windings are cooled via the thermal energy transfer.

The detailed description explains the invention, together with advantages and features, by way of examples with reference to the drawings.

DETAILED DESCRIPTION

Figure 1A:
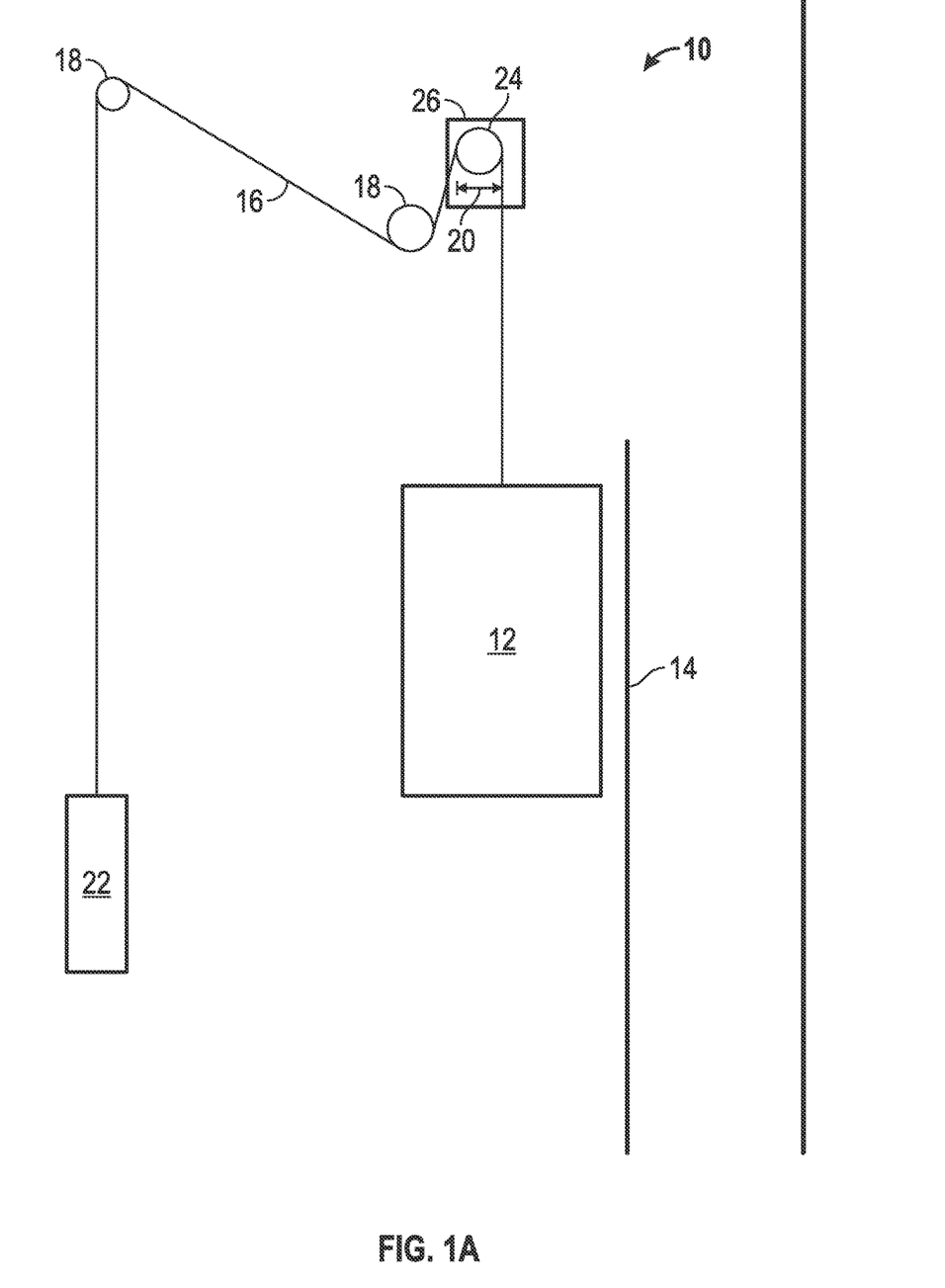
FIG. 1A is a schematic of an exemplary elevator system having a 1:1 roping arrangement.
Figure 1B:
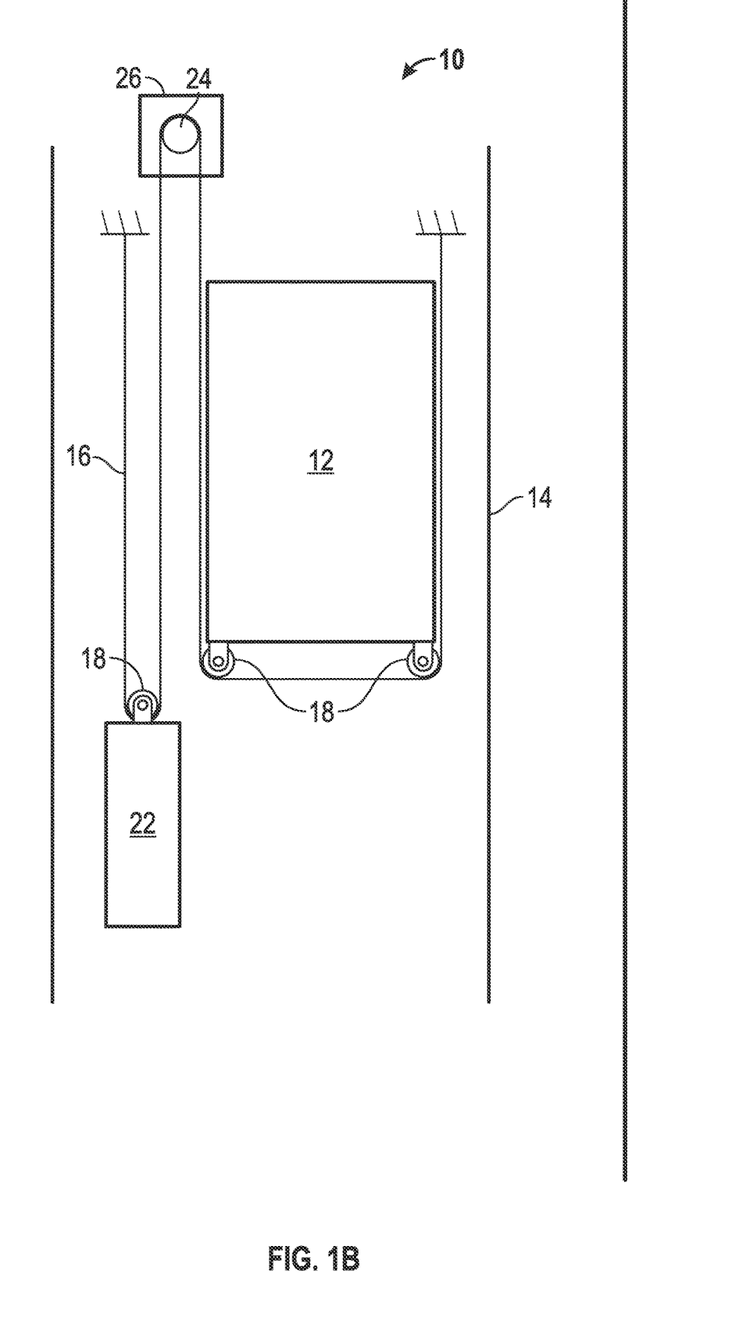
FIG. 1B is a schematic of another exemplary elevator system having a different roping arrangement.
Figure 1C:
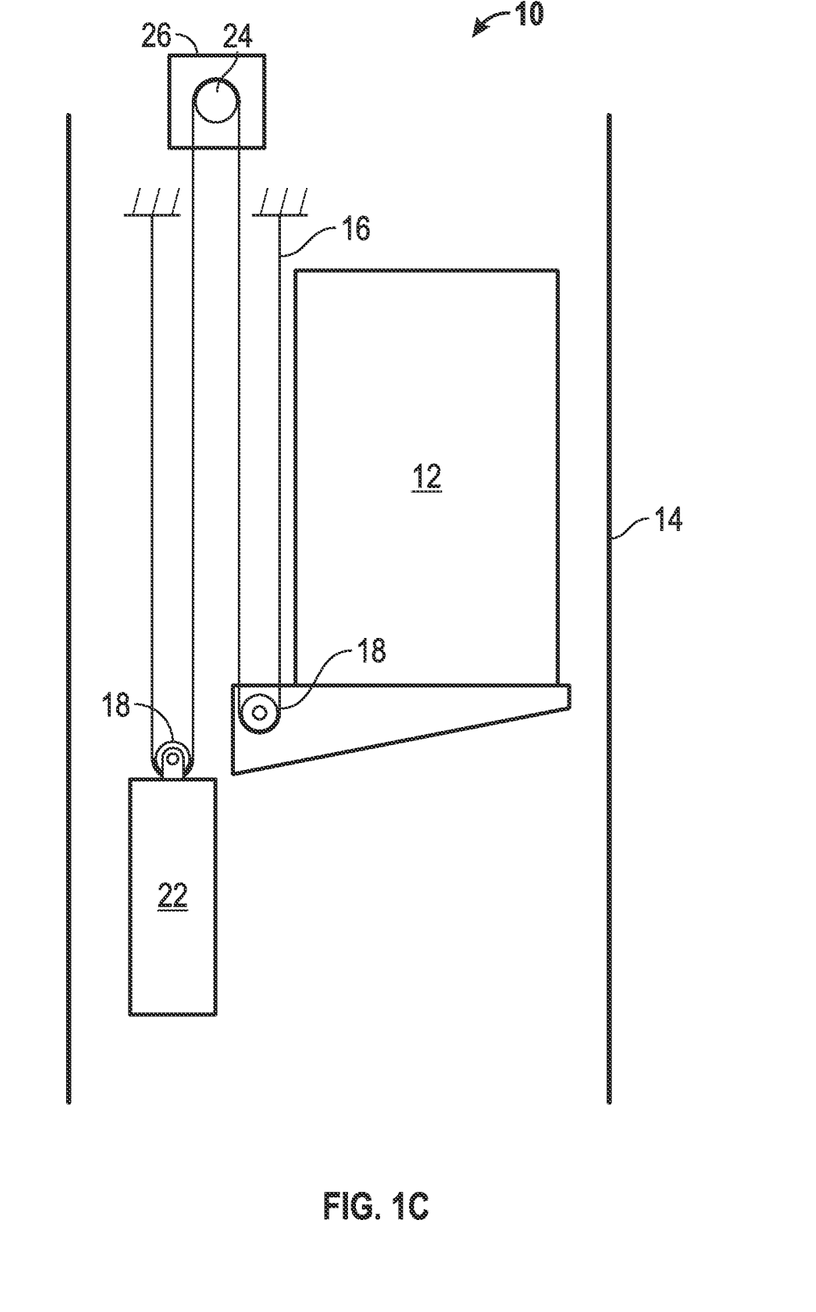
FIG. 1C is a schematic of another exemplary elevator system having a cantilevered arrangement.

Shown in FIGS. 1A, 1B and 1C are schematics of exemplary traction elevator systems 10. Features of the elevator system 10 that are not required for an understanding of the present invention (such as the guide rails, safeties, etc.) are not discussed herein. The elevator system 10 includes an elevator car 12 operatively suspended or supported in a hoistway 14 with one or more drive members 16. The drive member 16 may be, for example a rope of a coated steel belt. The one or more drive members 16 interact with one or more sheaves 18 to be routed around various components of the elevator system 10. The one or more drive members 16 could also be connected to a counterweight 22, which is used to help balance the elevator system 10 and reduce the difference in belt tension on both sides of a traction sheave 24 during operation.

The traction sheave 24 is driven by a machine 26. Movement of the traction sheave 24 by the machine 26 drives, moves and/or propels (through traction) the one or drive members 16 that are routed around the traction sheave 24.

In some embodiments, the elevator system 10 could use two or more drive members 16 for suspending and/or driving the elevator car 12. In addition, the elevator system 10 could have various configurations such that either both sides of the one or more drive members 16 engage the one or more sheaves 18 (such as shown in the exemplary elevator systems in FIG. 1A, 1B or 1C) or only one side of the one or more drive members 16 engages the one or more sheaves 18.

FIG. 1A provides a 1:1 roping arrangement in which the one or more drive members 16 terminate at the car 12 and counterweight 22. FIGS. 1B and 1C provide different roping arrangements. Specifically, FIGS. 1B and 1C show that the car 12 and/or the counterweight 22 can have one or more sheaves 18 thereon engaging the one or more drive members 16 and the one or more drive members 16 can terminate elsewhere, typically at a structure within the hoistway 14 (such as for a machineroomless elevator system) or within the machine room (for elevator systems utilizing a machine room). The number of sheaves 18 used in the arrangement determines the specific roping ratio (e.g., the 2:1 roping ratio shown in FIGS. 1B and 1C or a different ratio). FIG. 1C also provides a cantilevered type elevator. The present invention could be used on elevator systems other than the exemplary types shown in FIGS. 1A, 1B and 1C.

Figure 2:
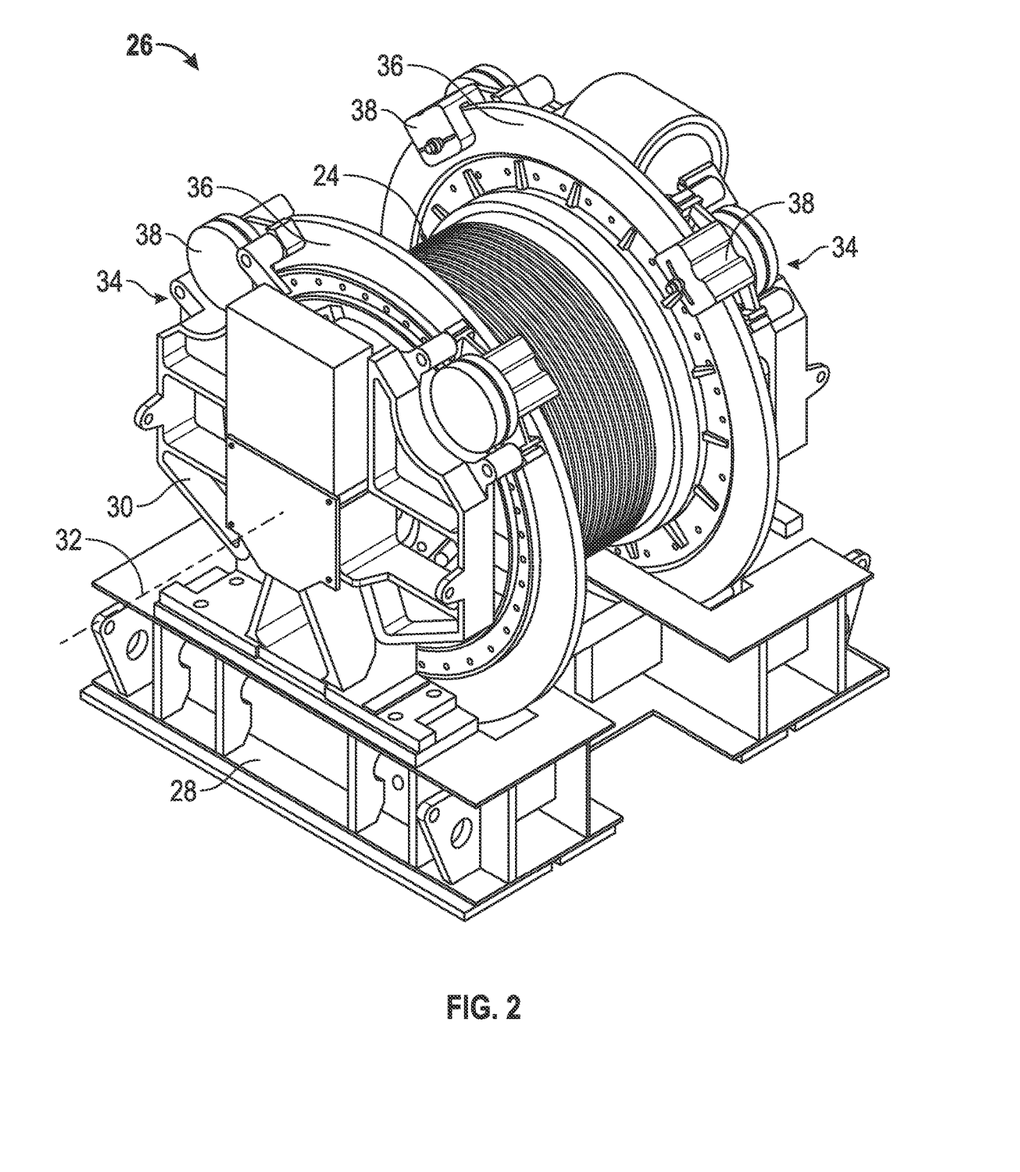
FIG. 2 is a perspective view of an embodiment of a machine for an elevator system.

Referring to FIG. 2, the machine 26 typically includes a bed plate 28 and a stand 30 fixed to the bed plate 28. The traction sheave 24 is rotatably secured to the stand 30 to rotate about a machine axis 32. The machine 26 further includes brake assemblies 34, including brake discs 36 rotatable with the traction sheave 24, and brake calipers 38 fixed to the stand 30. When the brake calipers 38 engage the brake discs 36, rotation of the traction sheave 24 about the machine axis 32 is slowed or stopped.

Figure 3:
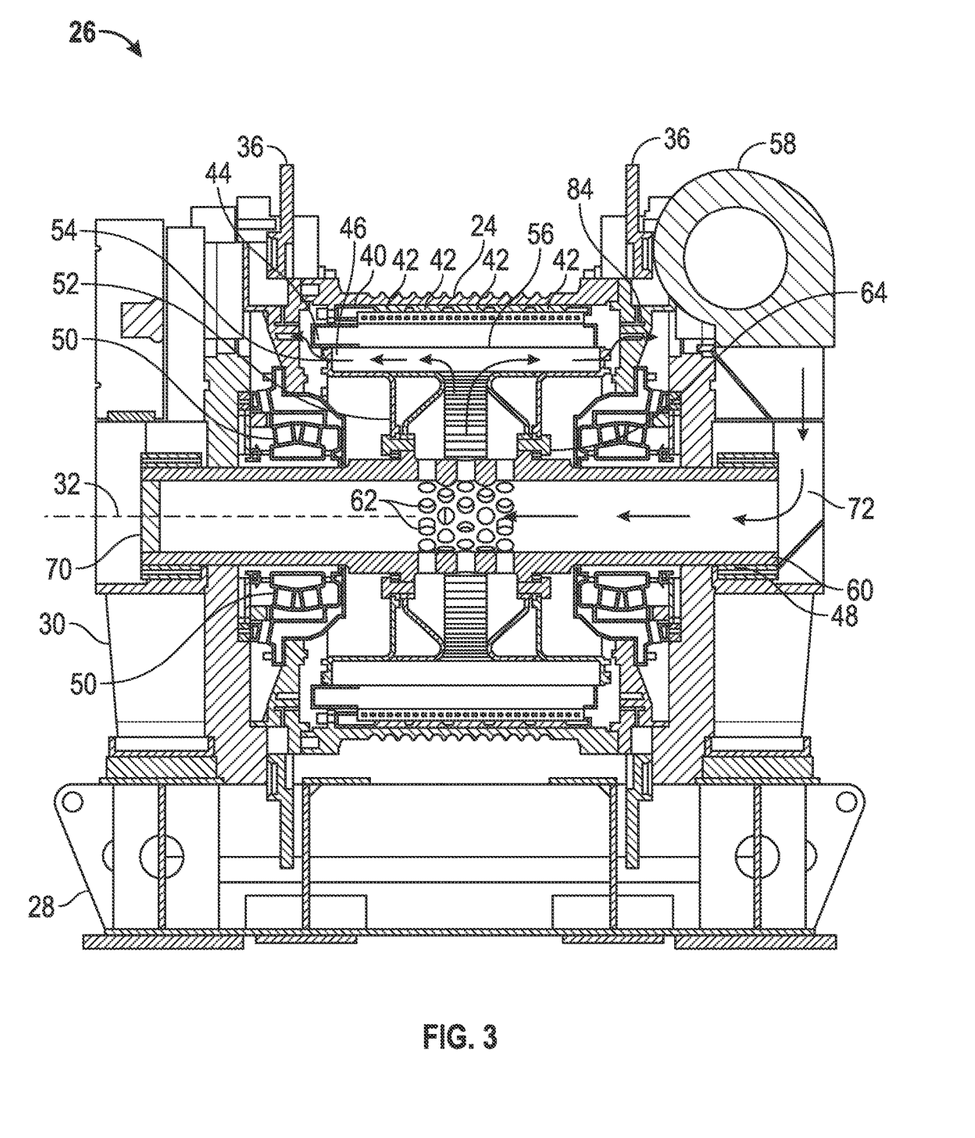
FIG. 3 is a cross-sectional view of an embodiment of a machine for an elevator system.

Referring now to the cross-sectional view of FIG. 3, the machine 26 is a permanent magnet electric machine, in this embodiment, an inside-out permanent magnet electric machine, meaning that a rotor 40, notably permanent magnets 42 of the rotor 40, are located radially outboard of stator windings 44 of a stator 46 of the machine 26. The traction sheave 24 is fixed to the rotor 40 to rotate therewith. The machine 26 includes a central shaft 48 located along the machine axis 32. Rotor bearings 50 are located at the shaft 48 between the shaft 48 and the rotor 40 to support the rotor 40 and allow for rotation of the rotor 40 relative to the fixed shaft 48 about the machine axis 32. The stator 46 is fixed to the shaft 48 via a stator support 52 that extends radially outwardly to a stator hub 54. The stator hub 54 supports the stator windings 44, located at a radially outboard surface 56 of the stator hub 54.

A blower 58 is fixed to the stand 30 to urge a cooling airflow 72 into the machine 26 to cool the stator windings 44. The airflow 72 is directed into the shaft 48 at, for example, an open end 60 of the shaft 48 and exits the shaft 48 at one or more cooling openings 62 located at, for example, an axial center portion of the shaft 48. The shaft further includes a cap 70 at an end of the shaft 48 opposite the open end 60 to prevent the airflow 72 from bypassing the cooling openings 62. The airflow 72 leaving the shaft 48 is circulated through an interior 64 of the stator hub 54 before exiting the machine 26 at, for example, brake disc openings 84. While circulating in the interior 64, the airflow 72 exchanges thermal energy with the stator windings 44 via the stator hub 54, thus cooling the stator windings 44.

Figure 4:
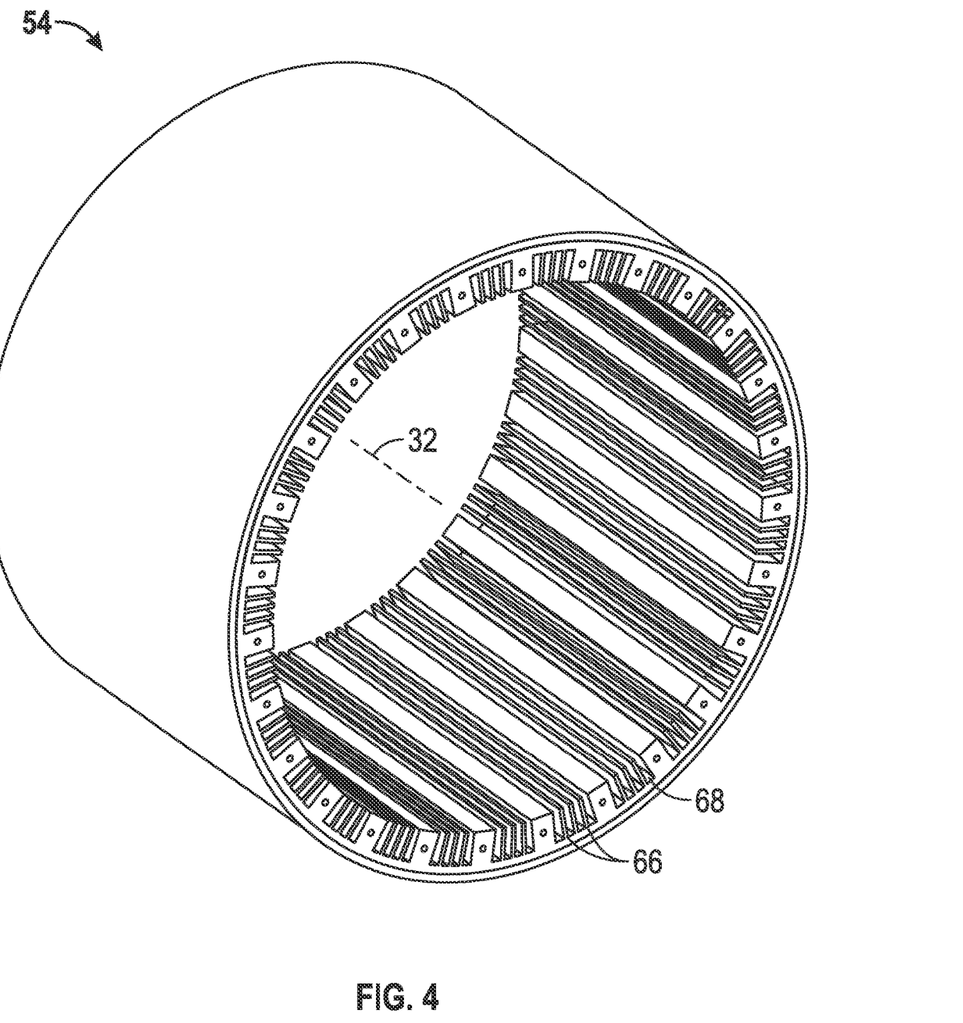
FIG. 4 is a view of an embodiment of a stator assembly for a machine.

Referring now to FIG. 4, the stator hub 54 includes a plurality of fins 66 extending radially inwardly from an inboard hub surface 68 toward the machine axis 32. The fins 66 increase an effective surface area for thermal energy transfer between the airflow 72 and the stator windings 44, thus increasing an effectiveness of the airflow 72 in cooling the stator windings 44. In some embodiments, the fins 66 are formed as a unitary structure with the stator hub 54 by, for example casting. Casting the fins 66 with the stator hub 54 as a single structure greatly simplifies and reduces cost of manufacturing the stator hub 54. In the embodiment of FIG. 4, the fins 66 extend along the stator hub 54 in a substantially axial direction, but other arrangements, such as helically-extending fins 66 are contemplated within the scope of the present disclosure.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An elevator system comprising:
    an elevator car;
    a drive member operably connected to the elevator car;
    a traction sheave in frictional contact with the drive member;
    a machine operably connected to the traction sheave, the machine including:
        a rotor including a plurality of permanent magnets, the rotor rotatable about a central axis of the machine;
        a stator including:
            a stator hub;
            a plurality of stator windings disposed at the stator hub and located radially inboard of the plurality of permanent magnets; and
            a plurality of fins extending radially inwardly from an inner surface of the stator hub, the plurality of fins including:
                one or more first fins having a first circumferential thickness; and
                one or more second fins having a second circumferential thickness different from the first circumferential thickness;
        a central shaft fixed to and supportive of the stator, the rotor configured to rotate relative to the central shaft, the central shaft including:
            an open end;
            a plurality of cooling openings in the central shaft configured such that a cooling airflow flows into the central shaft via the open end and out of the shaft via the plurality of cooling openings and across the plurality of fins to cool the stator; and
            a cap disposed at and defining a closed end opposite the open end, the cap configured to prevent the cooling airflow from bypassing the plurality of cooling openings; and
        a stator support fixed to the central shaft, the stator support extending radially outwardly from the central shaft to the stator hub to support the stator hub.

2. The elevator system of claim 1, wherein the plurality of fins are formed integral to the stator hub.

3. The elevator system of claim 1, further comprising a blower to urge the cooling airflow across the plurality of fins to cool the plurality of stator windings.

4. The elevator system of claim 1, wherein the plurality of fins extend substantially axially along the inner surface.

5. An electric machine comprising:
    a rotor including a plurality of permanent magnets, the rotor rotatable about a central axis of the machine;
    a stator including:
        a stator hub;
        a plurality of stator windings disposed at the stator hub and located radially inboard of the plurality of permanent magnets; and
        a plurality of fins extending radially inwardly from an inner surface of the stator hub, the plurality of fins including:
            one or more first fins having a first circumferential thickness; and
            one or more second fins having a second circumferential thickness different from the first circumferential thickness;
    a central shaft fixed to and supportive of the stator, the rotor configured to rotate relative to the central shaft, the central shaft including:
        an open end;
        a plurality of cooling openings in the central shaft configured such that a cooling airflow flows into the central shaft via the open end and out of the shaft via the plurality of cooling openings and across the plurality of fins to cool the stator; and a cap disposed at and defining a closed end opposite the open end, the cap configured to prevent the cooling airflow from bypassing the plurality of cooling openings; and a stator support fixed to the central shaft, the stator support extending radially outwardly from the central shaft to the stator hub to support the stator hub.

6. The machine of claim 5, wherein the plurality of fins are formed integral to the stator hub.

7. The machine of claim 6, wherein the plurality of fins are formed integral to the stator hub by casting with the stator hub.

8. The machine of claim 5, further comprising a blower to urge the cooling airflow across the plurality of fins to cool the plurality of stator windings.

9. The machine of claim 5, wherein the plurality of fins extend substantially axially along the inner surface.

10. A method of cooling stator windings of an electric machine comprising:

urging a cooling airflow into the machine via an open end of a central shaft toward a stator assembly of the machine, the stator assembly including:

a stator hub;

a plurality of stator windings disposed at the stator hub and located radially inboard of a rotor of the electric machine; and a plurality of fins extending radially inwardly from an inner surface of the stator hub, the plurality of fins including:

one or more first fins having a first circumferential thickness; and one or more second fins having a second circumferential thickness different from the first circumferential thickness; and a cap disposed at and defining a closed end opposite the open end;

flowing the cooling airflow out of the central shaft via a plurality of cooling openings in the central shaft, the cap configured to prevent the cooling airflow from bypassing the plurality of cooling openings;

flowing the cooling airflow through a stator support, the stator support fixed to the central shaft and extending radially outwardly from the central shaft to the stator hub;

flowing the cooling airflow across the plurality of fins, thus transferring thermal energy between the cooling airflow and the plurality of stator windings; and cooling the plurality of stator windings via the thermal energy transfer.

\* \* \* \* \*